(12) United States Patent
Inagaki

(10) Patent No.: US 12,175,132 B2
(45) Date of Patent: Dec. 24, 2024

(54) CONTROL DEVICE AND CONTROL METHOD

(71) Applicant: Toshiba Tec Kabushiki Kaisha, Tokyo (JP)

(72) Inventor: Yasuhiro Inagaki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/345,262

(22) Filed: Jun. 30, 2023

(65) Prior Publication Data
US 2024/0201901 A1   Jun. 20, 2024

(30) Foreign Application Priority Data
Dec. 20, 2022   (JP) ................................ 2022-203369

(51) Int. Cl.
G06F 3/06   (2006.01)

(52) U.S. Cl.
CPC .......... *G06F 3/0659* (2013.01); *G06F 3/0604* (2013.01); *G06F 3/0683* (2013.01)

(58) Field of Classification Search
CPC .... G06F 3/0659; G06F 3/0604; G06F 3/0683; G06F 11/1417; G06F 11/1446
See application file for complete search history.

(56) References Cited

U.S. PATENT DOCUMENTS

| 2009/0150598 A1* | 6/2009 | Jung | G06F 11/1666 |
| | | | 711/E12.008 |
| 2014/0359260 A1 | 12/2014 | Utsumi | |
| 2017/0212793 A1* | 7/2017 | Choi | G06F 9/441 |

* cited by examiner

*Primary Examiner* — Khoa D Doan
*Assistant Examiner* — Julian S Mendel
(74) *Attorney, Agent, or Firm* — Kim & Stewart LLP

(57) ABSTRACT

According to an embodiment, a control device executes control processing based on data stored in a first storage device and a second storage device while performing rewrite in the first storage device. The control device stores a memory image relating to the first storage device at a point of time, at which activation processing is terminated, in a non-limited storage area of the second storage device, the activation processing being based on the data stored in the limited storage area of the second storage device without being based on the data stored in the first storage device. The control device starts the control processing from the point of time, at which the activation processing is terminated, after loading the memory image stored in the non-limited storage area of the second storage device in the first storage device in the activation processing of the control processing.

10 Claims, 4 Drawing Sheets

CONTROL DEVICE AND CONTROL METHOD

CROSS-REFERENCE TO RELATED APPLICATIONS

This application is based upon and claims the benefit of priority from the prior Japanese Patent Application No. 2022-203369, filed on Dec. 20, 2022, the entire contents of which are incorporated herein by reference.

FIELD

An embodiment described herein generally relates to a control device and a control method.

BACKGROUND

A hibernation technique is known in control devices for suppressing power consumption of equipment associated with computer control. However, a conventional control device creates a memory image so as to record the operating state of the equipment in every transfer to a power-saving state on the assumption that the equipment returns to its operating state before transferring to the power-saving state.

Thus, in a situation in which the memory image is not normally created, for example, when power feeding to the equipment is shut off due to power failure, it has been difficult to perform hibernation. In view of such circumstances, it has been desired to perform hibernation without creating a memory image in each transfer to a power-saving state.

DETAILED DESCRIPTION

According to one embodiment, a control device includes a first storage device, a second storage device, and a processor. In the first storage device, rewrite of stored data is allowed. The second storage device includes a limited storage area in which rewrite of stored data is prevented, and a non-limited storage area in which rewrite of stored data is allowed. The processor executes activation processing to start control processing for a device to be controlled, the activation processing being based on the data stored in the limited storage area of the second storage device without being based on the data stored in the first storage device. The processor executes the control processing based on the data stored in the first storage device and the data stored in the second storage device while rewriting the data stored in the first storage device. The processor stores a memory image relating to the first storage device at a point of time, at which the activation processing is terminated, in the non-limited storage area of the second storage device. Further, the processor starts the control processing from the point of time, at which the activation processing is terminated, after loading the memory image stored in the non-limited storage area of the second storage device in the first storage device in the activation processing of the control processing.

Figure 1:
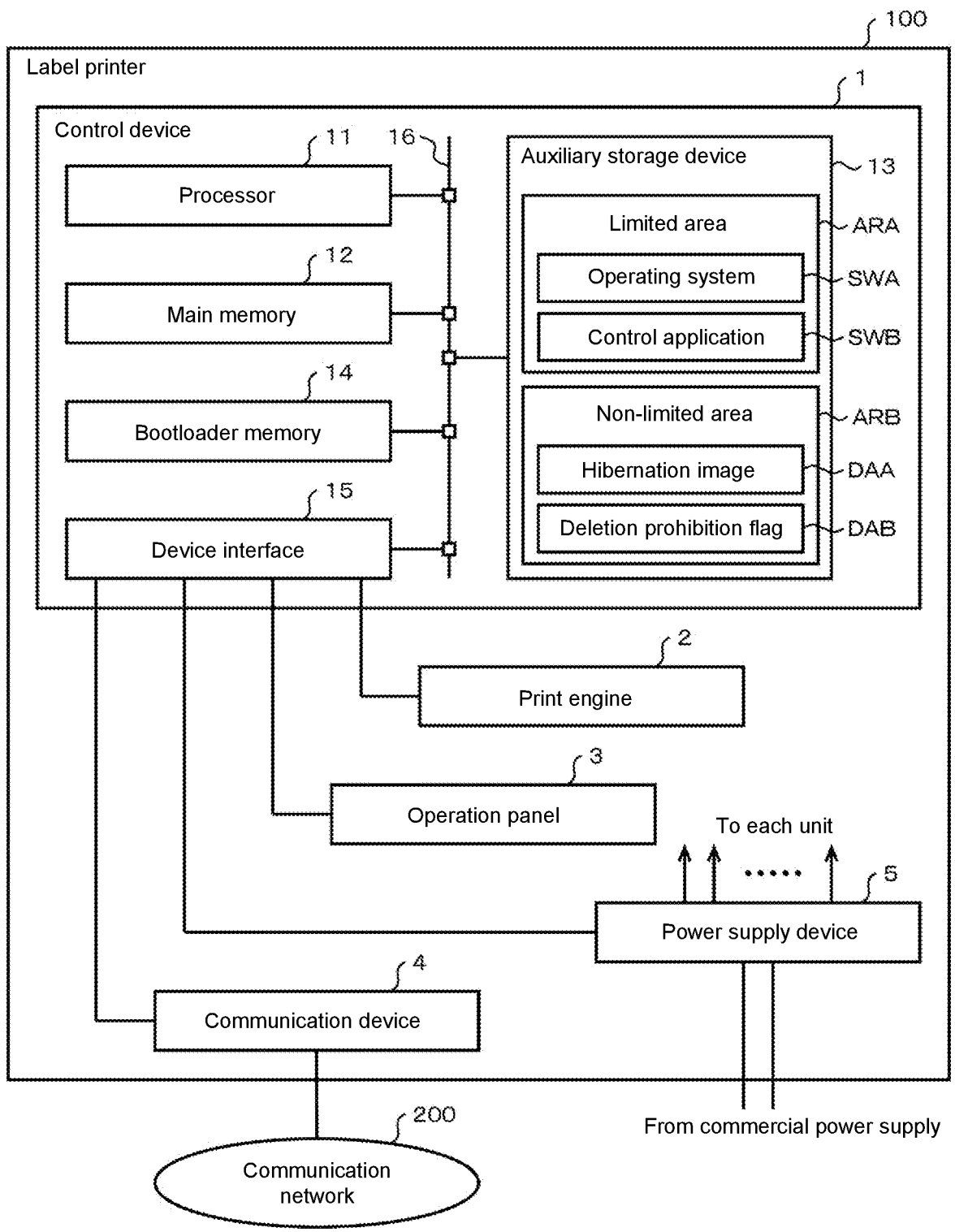
FIG. 1 is a block diagram showing a schematic configuration of a label printer according to an embodiment and a main circuit configuration of a control device.

Hereinafter, an exemplary embodiment will be described with reference to the drawings. Note that in this embodiment a label printer will be described as an exemplary device. In the drawings, the same reference symbols represent the same or similar parts. FIG. 1 is a block diagram showing a schematic configuration of a label printer 100 according to this embodiment and a main circuit configuration of a control device 1. The label printer 100 includes a control device 1, a print engine 2, an operation panel 3, a communication device 4, and a power supply device 5. The label printer 100 may include another device such as a radio frequency identification (RFID) device.

The control device 1 controls various devices, such as the print engine 2, the operation panel 3, and the communication device 4, included in the label printer 100. The print engine 2 prints any image on label paper. For the print engine 2, well-known various image forming devices of a thermal type, a thermal transfer type, an ink-jet type, and the like can be used alone or in combination.

The operation panel 3 includes an input unit, a display unit, and a sound unit. The input unit inputs an instruction of an operator. For the input unit, well-known various input devices such as a touch panel, a key switch, a universal serial bus (USB) medium, a mouse, a network controller, a general-purpose input/output (GPIO), and a serial peripheral interface (SPI) can be used alone or in combination. The display unit executes a display operation for notifying the operator of various types of information. For the display unit, well-known various display devices such as a liquid crystal display and a light emitting diode (LED) lamp can be used alone or in combination. The sound unit outputs sounds for various guides and alarms. For the sound unit, well-known various sound devices such as a sound synthesis device and a buzzer can be used alone or in combination.

The communication device 4 executes communication processing for communication via a communication network 200. The communication network 200 is, for example, a local area network (LAN). In this case, for the communication device 4, well-known various communication devices for LAN can be used. Note that various other networks such as the Internet, a virtual private network (VPN), LAN, a public telecommunication network, and a mobile communication network may be used for the communication network 200. For the communication device 4, a device adapted to a communication network 200 to be used is used. The power supply device 5 receives power supplied from a commercial power supply and generates operating power of various electric devices included in the label printer 100.

Those print engine 2, operation panel 3, and communication device 4 are examples of devices to be controlled by the control device 1. Note that those print engine 2, operation panel 3, and communication device 4 may include devices to be controlled by the control device 1. For example, if the label printer 100 includes an RFID unit, the RFID unit is to be controlled by the control device 1.

The control device 1 includes a processor 11, a main memory 12, an auxiliary storage device 13, a bootloader memory 14, a device interface 15, and a transmission path 16. The processor 11, the main memory 12, the auxiliary storage device 13, the bootloader memory 14, and the device interface 15 are communicable with each other via the transmission path 16. The processor 11, the main memory 12, and the auxiliary storage device 13 are communicable with each other via the transmission path 16, so that a computer for controlling the control device 1 is configured.

The processor 11 corresponds to the central portion of the computer. The processor 11 executes information processing for implementing various functions as the control device 1 according to information processing programs such as an operating system, firmware, and an application program. The processor 11 also performs information processing based on a bootloader stored in the bootloader memory 14. The processor 11 is, for example, a central processing unit (CPU).

The main memory 12 corresponds to the main storage portion of the computer. For the main memory 12, for example, a volatile storage device such as a dynamic random access memory (DRAM) or a static random access memory (SRAM) is used. The main memory 12 corresponds to a first storage device.

The auxiliary storage device 13 corresponds to the auxiliary storage portion of the computer. The auxiliary storage device 13 may include well-known devices such as an electric erasable programmable read-only memory (EEPROM), a hard disc drive (HDD), and a solid state drive (SSD) alone or in combination. The auxiliary storage device 13 saves data to be used when the processor 11 performs various types of processing, data created by the processing of the processor 11, and the like. The auxiliary storage device 13 stores the above-mentioned information processing programs. The bootloader memory 14 stores a bootloader. The bootloader is software relating to information processing for activating the information processing based on the operating system by the processor 11.

The device interface 15 is connected with various devices, such as the print engine 2, the operation panel 3, the communication device 4, and the power supply device 5, included in the label printer 100. The device interface 15 executes communication processing for exchanging data with the devices connected thereto under the control of the processor 11. For the device interface 15, for example, well-known devices conforming to a universal serial bus (USB) standard can be used. Further, for the device interface 15, well-known devices conforming to a wireless LAN standard may be used to exchange data with various devices through wireless communication. Furthermore, for the device interface 15, well-known interface devices conforming to a peripheral component interconnect express (PCIe) standard can be used. Note that the device interface 15 may include various types of interface devices and selectively connect a plurality of devices to be connected to the control device 1. The transmission path 16 includes an address bus, a data bus, a control signal line, and the like and transmits data and control signals exchanged between the connected units.

The control device 1 is constituted by, for example, mounting the processor 11, the main memory 12, the auxiliary storage device 13, and the device interface 15 on a printed circuit board on which the transmission path 16 is formed. Note that the processor 11, the main memory 12, the auxiliary storage device 13, and the device interface 15 may be fixedly attached to the printed circuit board by soldering or the like or may be detachably attached to a socket or slot attached to the printed circuit board. For example, the DRAM included in the main memory 12 may be attached to a memory slot attached to the printed circuit board and may be replaceable.

A part of the storage area of the auxiliary storage device 13 is defined as a limited area ARA. Further, another part of the storage area of the auxiliary storage device 13 is defined as a non-limited area ARB. Those limited area ARA and non-limited area ARB are configured by, for example, partitioning the storage area of one storage device. Alternatively, for example, storage areas of different storage devices may be allocated for the limited area ARA and the non-limited area ARB, respectively.

The limited area ARA is an area for saving files that do not need rewrite associated with a normal operation of the label printer 100. In the limited area ARA, for example, an operating system SWA and a control application SWB are saved. The operating system SWA is system software for the processor 11. The operating system SWA may be any one of various existing operating systems. The control application SWB is application software for causing the processor 11 to perform control processing for implementing the functions as the label printer 100.

The non-limited area ARB is an area for permitting rewrite of data files stored. In the non-limited area ARB, for example, a hibernation image DAA and a deletion prohibition flag DAB are saved. The hibernation image DAA is a memory image for hibernation to be described later. The deletion prohibition flag DAB is flag data indicating whether to prohibit deletion of the hibernation image DAA.

Next, the operation of the label printer 100 configured as described above will be described. Note that the operation for printing labels may be similar to that of existing label printers, and thus description thereof will be omitted. Here, description will be mainly given on an activation-related operation before starting the operation for printing labels when the power supply of the label printer 100 is turned on. Note that details of various types of processing to be described later are examples, and it is possible to appropriately change the order of part of processing, omit part of processing, or add other processing. For example, in the following description, in order to easily understand characteristic operations of this embodiment, description of some processing will be omitted. For example, when some error occurs, processing for coping with that error may be performed, but description on part of such processing will be omitted.

After an operation for turning on the power supply of the label printer 100, power is started to be fed from the power supply device 5 to each unit of the label printer 100. In response to this power feeding, the processor 11 starts the operation and executes activation firmware stored in a nonvolatile memory area of the main memory 12, a read-only memory (ROM) (not shown), or the like. The activation firmware is, for example, a basic input output system (BIOS) or an unified extensible firmware interface (UEFI). The processor 11 initializes various devices included in the control device 1 on the basis of the activation firmware, and reads the bootloader, which is stored in the bootloader memory 14, in the main memory 12, and then starts execution of that bootloader separately from the activation firmware.

Figure 2:
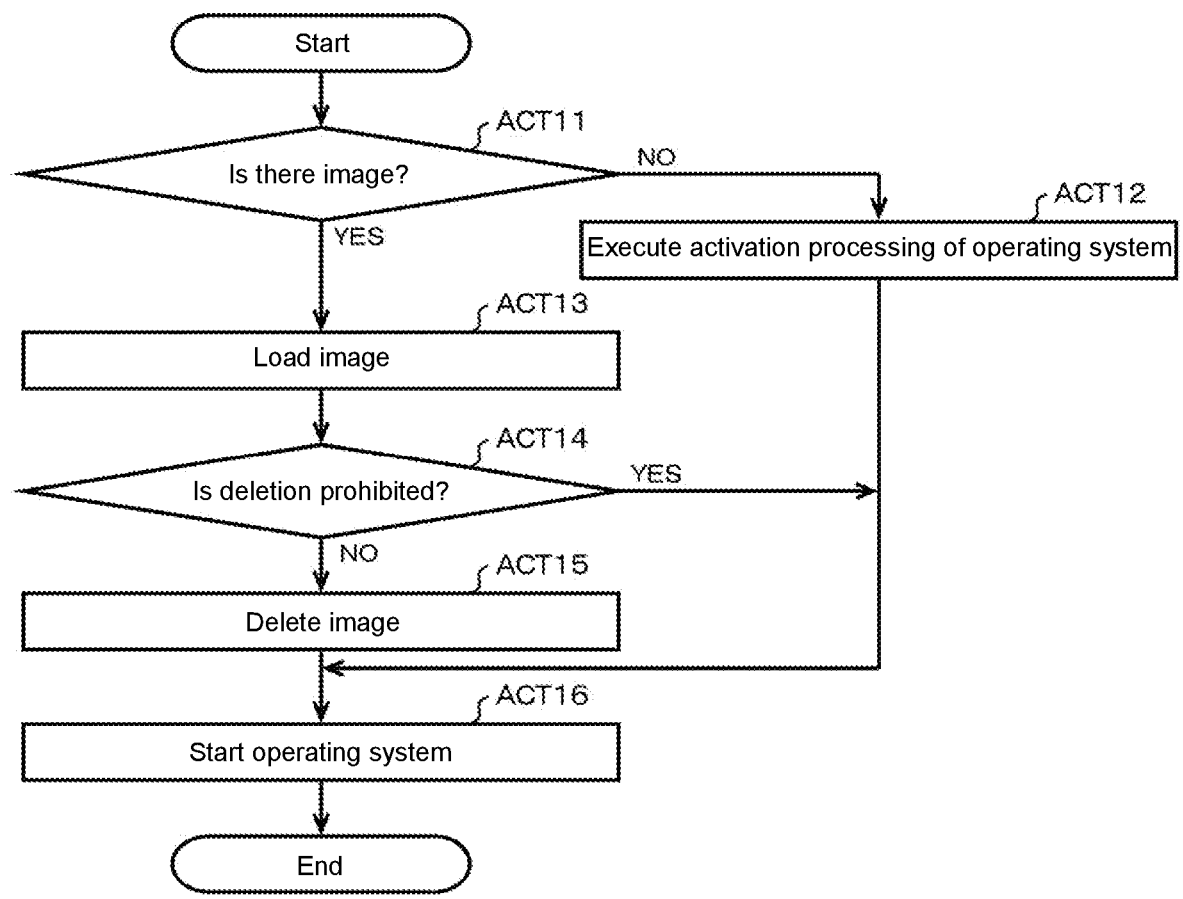
FIG. 2 is a flowchart showing a bootloader according to the embodiment.

FIG. 2 is a flowchart showing the bootloader. In ACT11, the processor 11 confirms whether there is a hibernation image or not. For example, if the processor 11 confirms that a hibernation image DAA is not stored in the auxiliary storage device 13 (NO in ACT11), the processing of the processor 11 proceeds to ACT12. In ACT12, the processor 11 executes activation processing of the operating system. The activation processing is processing for a so-called cold start and may be well-known processing corresponding to the specifications of the operating system.

Meanwhile, for example, if the processor 11 confirms that a hibernation image DAA is stored in the auxiliary storage device 13 (determines YES in ACT11), the processing of the processor 11 proceeds to ACT13. In ACT13, the processor 11 loads the hibernation image DAA in the main memory 12.

In ACT14, the processor 11 confirms whether the deletion of the hibernation image DAA is prohibited or not. For example, if the processor 11 confirms that a deletion prohibition flag DAB is not in a state indicating prohibition, the processor 11 confirms that the deletion of the hibernation image DAA is not prohibited (NO in ACT14). The processing of the processor 11 then proceeds to ACT15.

In ACT15, the processor 11 deletes the hibernation image DAA from the auxiliary storage device 13. The processor 11 executes the information processing based on the bootloader in such a manner, so that the computer including the processor 11 as the central portion thereof functions as a deletion unit.

After the processor 11 terminates the processing of ACT12 or ACT15, in either case, the processing of the processor 11 proceeds to ACT16. Further, for example, if the processor 11 confirms that the deletion prohibition flag DAB is in the state indicating prohibition, the processor 11 confirms that the deletion of the hibernation image DAA is prohibited (YES in ACT14). The processing of the processor 11 then skips ACT15 and proceeds to ACT16. In ACT16, the processor 11 starts execution of the operating system SWA read in the main memory 12 separately from the bootloader. Thus, the processor 11 terminates the execution of the bootloader.

In such a manner, in ACT13, the processor 11 loads the hibernation image DAA in the main memory 12. After that, if the processing of the processor 11 proceeds to ACT16, the processor 11 activates the operating system SWA by using the hibernation image DAA. In such a manner, the processor 11 executes the information processing based on the bootloader, so that the computer including the processor 11 as the central portion thereof functions as an activation unit.

After activating the operating system SWA, the processor 11 starts execution of the control application SWB. By the execution of the control application SWB, the processor 11 performs control processing for controlling each unit of the label printer 100 in order to implement a desired function as the label printer 100. When performing this control processing, the processor 11 executes control processing based on the data stored in the main memory 12 and the data stored in the auxiliary storage device 13. The processor 11 executes information processing based on the control application SWB, so that the computer including the processor 11 as the central portion thereof functions as a control unit. If the processor 11 needs rewrite of the auxiliary storage device 13 in the control processing by the control application SWB, the processor 11 executes rewrite processing based on the control application SWB.

Figure 3:
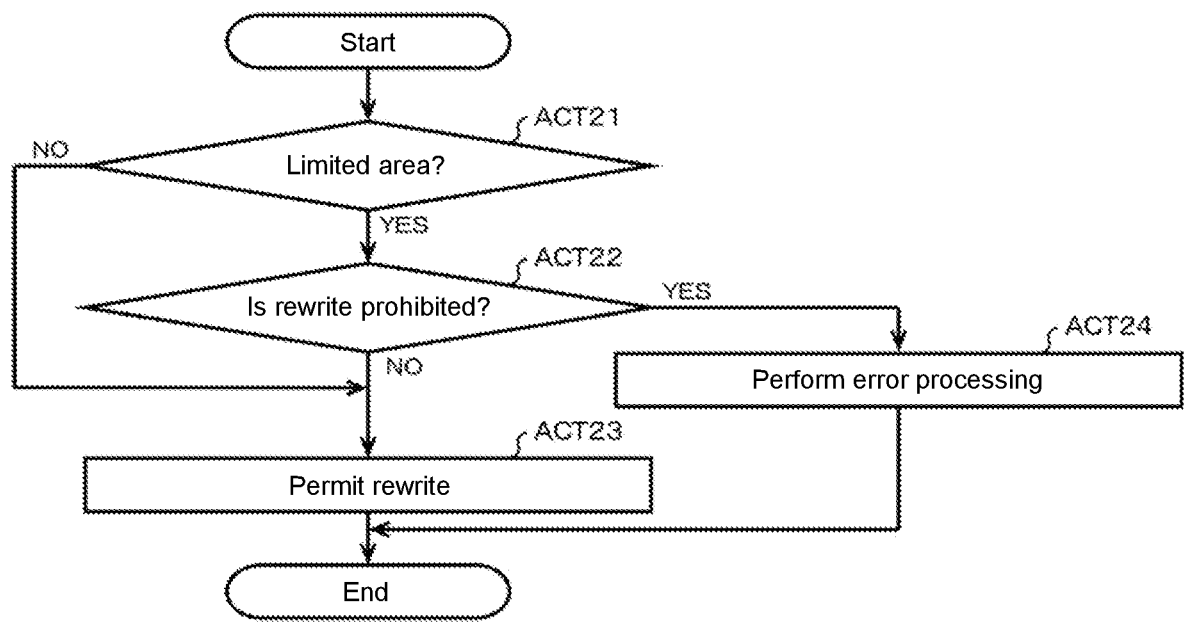
FIG. 3 is a flowchart showing rewrite processing according to the embodiment.

FIG. 3 is a flowchart showing the rewrite processing. In ACT21, the processor 11 confirms whether the storage area to be rewritten is the limited area ARA or not. If the storage area to be rewritten is the limited area ARA (YES in ACT21), the processing of the processor 11 proceeds to ACT22.

In ACT22, the processor 11 confirms whether the rewrite of the limited area ARA is prohibited or not. For example, if the deletion prohibition flag DAB is not in a state indicating the prohibition of deletion of the hibernation image DAA, the processor 11 confirms that the rewrite of the limited area ARA is not prohibited (NO in ACT22). The processing of the processor 11 proceeds to ACT23. In ACT21, if the storage area to be rewritten is not the limited area ARA, that is, if the storage area to be rewritten is the non-limited area ARB (NO in ACT21), the processing of the processor 11 skips ACT22 and proceeds to ACT23. In ACT23, the processor 11 permits rewrite with respect to the control processing. Thus, the processor 11 terminates the rewrite processing shown in FIG. 3.

However, in ACT22, for example, if the deletion prohibition flag DAB is in the state indicating deletion prohibition, the processor 11 confirms that the rewrite of the limited area ARA is prohibited (YES in ACT22). The processing of the processor 11 then proceeds to ACT24. In ACT24, the processor 11 performs error processing. For example, the processor 11 gives the control processing a notification indicating prohibition of rewrite of the storage area to be rewritten. The processor 11 then terminates the rewrite processing shown in FIG. 3 without executing the processing in ACT23.

In such a manner, if the deletion prohibition flag DAB is in the state indicating deletion prohibition, the limited area ARA is the storage area in which rewrite is not performed, and the auxiliary storage device 13 corresponds to a second storage device including such a storage area. The processor 11 then executes the information processing based on the control application SWB, so that the computer including the processor 11 as the central portion thereof functions as an inhibition unit.

Figure 4:
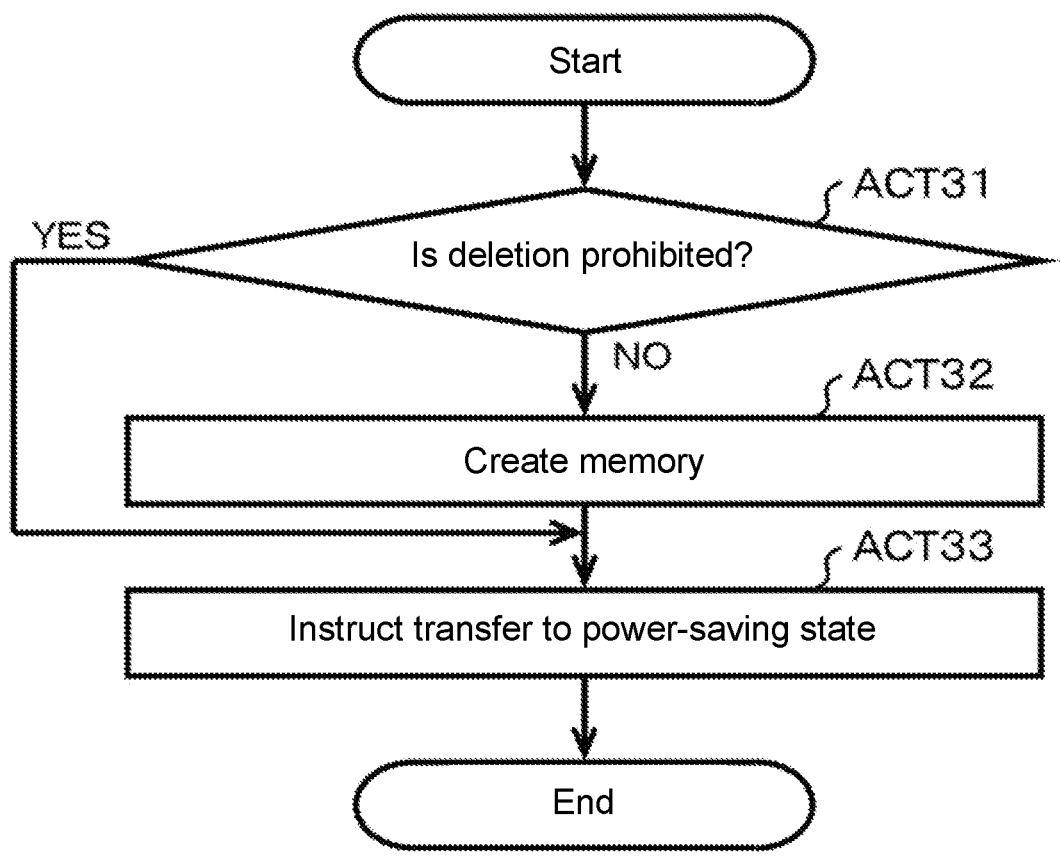
FIG. 4 is a flowchart of preparation processing according to the embodiment.

When having to transfer to a power-saving state, the processor 11 executes preparation processing for transferring to a power-saving state on the basis of the control application SWB. FIG. 4 is a flowchart showing the preparation processing.

In ACT31, the processor 11 confirms whether the deletion of the hibernation image is prohibited or not. For example, if the deletion prohibition flag DAB is not in the state indicating deletion prohibition, the processor 11 then confirms that the deletion of the hibernation image is not prohibited (NO in ACT31). The processing of the processor 11 then proceeds to ACT32.

In ACT32, the processor 11 creates a memory image of the main memory 12 at this point of time, and saves the memory image as a new hibernation image DAA in the non-limited area ARB. Subsequently, the processing of the processor 11 then proceeds to ACT33. In ACT31, for example, if the deletion prohibition flag DAB is in the state indicating deletion prohibition, the processor 11 confirms that the deletion of the hibernation image is prohibited (YES in ACT31). The processing of the processor 11 then skips ACT32 and proceeds to ACT33. In ACT33, the processor 11 instructs the power supply device 5 to transfer to a power-saving state. In response to this instruction, the power supply device 5 transfers to a power feeding state determined in advance as a power-saving state.

The processor 11 performs the control processing based on the control application SWB with the processing based on the operating system SWA being used as a basis, so that the label printer 100 operates the print engine 2 to print labels. The operating system SWA and the control application SWB are written in the auxiliary storage device 13 in manufacturing processing of the label printer 100 and are not rewritten in principle. Note that the operating system SWA and the control application SWB are rewritten for version upgrade or the like, but the frequency of rewrite is very low.

In other words, in repeating on/off of the power supply of the label printer 100, each time the power supply is turned on, the memory image of the main memory 12, which is obtained after the activation processing of the operating system SWA and the control application SWB by the processor 11, is the same every time.

In this regard, in the manufacturing process of the label printer 100, the memory image described above is written, as the hibernation image DAA, to the non-limited area ARB of the auxiliary storage device 13 in response to an instruction of an operator in a shipping preparation operation or a preparation operation for beginning of use. Further, the deletion prohibition flag DAB is set to the state indicating deletion prohibition. In such a manner, at that time, the auxiliary storage device 13 corresponds to a storage unit that stores the memory image of the main memory 12 at the point of time at which the activation processing based on the data stored in the limited area ARA is terminated.

In such a manner, in the control device 1, the hibernation image DAA remains stored in the auxiliary storage device 13 without being deleted even after it is used in the activation processing once performed, and is also repeatedly used in subsequent activation processing. This makes it possible to perform hibernation in subsequent activation processing even if a normal transfer to a power-saving state fails due to power failure or the like. In other words, the hibernation can be performed without creating the hibernation image DAA each time the transfer to the power-saving state is performed. Further, if the deletion prohibition flag DAB is set to a state not indicating deletion prohibition, the control device 1 can create the hibernation image DAA each time the transfer to the power-saving state is performed, and can also perform hibernation based on the hibernation image DAA.

As described above, in the control device 1, the hibernation image DAA is repeatedly used on the assumption that the limited area ARA is not rewritten. However, if the hibernation image DAA is repeatedly used regardless of the limited area ARA having been rewritten, there is a risk that normal activation is not performed. However, if there is a possibility that the deletion of the hibernation image DAA is not prohibited and the limited area ARA is rewritten in the control device 1, the hibernation image DAA after loaded in the main memory 12 is deleted from the auxiliary storage device 13. This prevents a situation in which normal activation is not performed as describe above.

Further, in the control device 1, if the deletion of the hibernation image DAA is prohibited, that is, if the hibernation image DAA is repeatedly used, rewrite of the limited area ARA is suppressed. This makes it possible to prevent the hibernation image DAA repeatedly used from being unsuitable for the hibernation.

In this embodiment, various modified embodiments to be described below can be performed. The application software executed by the processor 11 is written in the auxiliary storage device 13 in the manufacturing process or the like of the label printer 100 as described above. In normal use environments, any other application software is not performed by the processor 11. Thus, the application software may be created such that the processor 11 does not rewrite the limited area ARA when the application software is executed, thus preventing the rewrite of the limited area ARA. In this case, for example, the processor 11 does not have to perform the rewrite processing shown in FIG. 3.

The processor 11 may also execute the control processing on the basis of data other than the operating system SWA and the control application SWB stored in the limited area ARA.

The details of the control processing performed by the processor 11 may be discretionarily performed, and the target to be controlled may also be various devices other than the label printer 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device, comprising:
a first storage device in which rewrite of stored data is allowed;
a second storage device including
a limited storage area in which rewrite of stored data is prevented, and
a non-limited storage area in which rewrite of stored data is allowed; and
a processor configured to
execute activation processing to start control processing for a device to be controlled, the activation processing being based on the data stored in the limited storage area of the second storage device without being based on the data stored in the first storage device,
execute the control processing based on the data stored in the first storage device and the data stored in the second storage device while rewriting the data stored in the first storage device,
store a memory image relating to the first storage device at a point of time, at which the activation processing is terminated, in the non-limited storage area of the second storage device, and
start the control processing from the point of time, at which the activation processing is terminated, after loading the memory image stored in the non-limited storage area of the second storage device in the first storage device in the activation processing of the control processing.

2. The control device according to claim 1, wherein
the processor causes the memory image loaded in the first storage device to remain stored in the non-limited storage area of the second storage device when deletion of the memory image is prohibited, and
the processor deletes the memory image from the non-limited storage area of the second storage device when deletion of the memory image is not prohibited.

3. The control device according to claim 2, wherein
the non-limited storage area of the second storage device further stores flag data indicating whether to prohibit deletion of the memory image or not.

4. The control device according to claim 3, wherein
the processor causes the memory image to remain stored in the non-limited storage area of the second storage device when the flag data indicates that deletion of the memory image is prohibited, and
the processor deletes the memory image from the non-limited storage area of the second storage device when the flag data does not indicate that deletion of the memory image is prohibited.

5. The control device according to claim 1, wherein
the limited storage area of the second storage device is a volatile storage area in which the rewrite of the stored data is allowed, and the processor prevents the rewrite of the data stored in the limited storage area.

6. The control device according to claim 5, wherein the processor prevents the rewrite of the data stored in the limited storage area when deletion of the memory image is prohibited.

7. The control device according to claim 6, wherein the non-limited storage area of the second storage device stores the memory image and flag data indicating whether to prohibit deletion of the memory image or not, and
the processor prevents the rewrite of the data stored in the limited storage area of the second storage device when the flag data indicates that deletion of the memory image is prohibited.

8. The control device according to claim 7, wherein the processor permits the rewrite of the data stored in the limited storage area of the second storage device when the flag data does not indicate that deletion of the memory image is prohibited.

9. The control device according to claim 1, wherein the control processing executed by the processor includes processing in which the rewrite of the data stored in the limited storage area of the second storage device is not performed.

10. A control method for a control device, the control device including a first storage device in which rewrite of stored data is allowed and a second storage device including a limited storage area in which rewrite of stored data is prevented and a non-limited storage area in which rewrite of stored data is allowed, the control method comprising:
executing activation processing to start control processing for a device to be controlled, the activation processing being based on the data stored in the limited storage area of the second storage device without being based on the data stored in the first storage device;
executing the control processing based on the data stored in the first storage device and the data stored in the second storage device while rewriting the data stored in the first storage device;
storing a memory image relating to the first storage device at a point of time, at which the activation processing is terminated, in the non-limited storage area of the second storage device; and
starting the control processing from the point of time, at which the activation processing is terminated, after loading the memory image stored in the non-limited storage area of the second storage device in the first storage device in the activation processing of the control processing.

* * * * *